US008129861B2

(12) United States Patent
Kuhl et al.

(10) Patent No.: US 8,129,861 B2
(45) Date of Patent: Mar. 6, 2012

(54) ELECTRICAL VOLTAGE SUPPLY

(75) Inventors: Matthias Kuhl, Freiburg (DE); Claas Müller, Freiburg (DE); Yiannos Manoli, Freiburg (DE); Gilbert Erdler, Freiburg (DE)

(73) Assignee: Micronas GmbH, Freiburg I.BR. (DE)

( * ) Notice: Subject to any disclaimer, the term of this patent is extended or adjusted under 35 U.S.C. 154(b) by 227 days.

(21) Appl. No.: 12/603,013

(22) Filed: Oct. 21, 2009

(65) Prior Publication Data

US 2010/0096930 A1     Apr. 22, 2010

(30) Foreign Application Priority Data

Oct. 22, 2008   (EP) .................................... 08018466

(51) Int. Cl.
*H02J 1/00* (2006.01)

(52) U.S. Cl. ........................................................ 307/80
(58) Field of Classification Search ...................... 307/80
See application file for complete search history.

(56) References Cited

U.S. PATENT DOCUMENTS

| | | | |
|---|---|---|---|
| 2,906,941 A | 9/1959 | Brolin | |
| 4,476,399 A | 10/1984 | Yoshida et al. | |
| 4,543,522 A | 9/1985 | Moreau | |
| 6,002,295 A | 12/1999 | Gens et al. | |
| 6,292,378 B1 | 9/2001 | Brooks et al. | |
| 2004/0070370 A1 | 4/2004 | Emura | |
| 2011/0101938 A1* | 5/2011 | Ma et al. | 323/282 |

FOREIGN PATENT DOCUMENTS

| | | |
|---|---|---|
| DE | 33 20 885 A1 | 12/1983 |
| EP | 0 838 745 A1 | 4/1998 |
| EP | 1 414 126 A1 | 4/2004 |
| JP | 10-201104 A | 7/1998 |

OTHER PUBLICATIONS

Rincon-Mora et al.; "A Low-Voltage, Low Quiescent Current, Low Drop-Out Regulator"; IEEE Journal of Solid-State Circuits; Jan. 1998; vol. 33, No. 1.

* cited by examiner

*Primary Examiner* — Robert L. Deberadinis
(74) *Attorney, Agent, or Firm* — Muncy, Geissler, Olds & Lowe, PLLC

(57) ABSTRACT

A voltage supply has a plurality of voltage sources to supply output connections. To achieve closed-loop control of the output voltage at the output connections, a closed-loop control circuit is provided that has an actuating element for each voltage source, and each respective actuating element has a current path via which a connection of the respective voltage source can be connected to an output connection. Each actuating element has an actuating signal input for setting the electrical conductivity of its current path. The closed-loop control circuit has a closed-loop controller to which the output voltage and a desired voltage signal are supplied. When a deviation occurs between the output voltage and the desired voltage signal, the closed-loop controller interacts with at least one actuating signal input in order to reduce the deviation. The actuating signal inputs are connected to a control device that is designed in such a way, that the current path of at least one actuating element is enabled for control by the closed-loop controller if the output current that is drawn at the output connections is present in a predetermined value range assigned to the respective actuating element, and the current path is disabled if the output current that is drawn at the output connections does not lie in the predetermined value range.

13 Claims, 3 Drawing Sheets

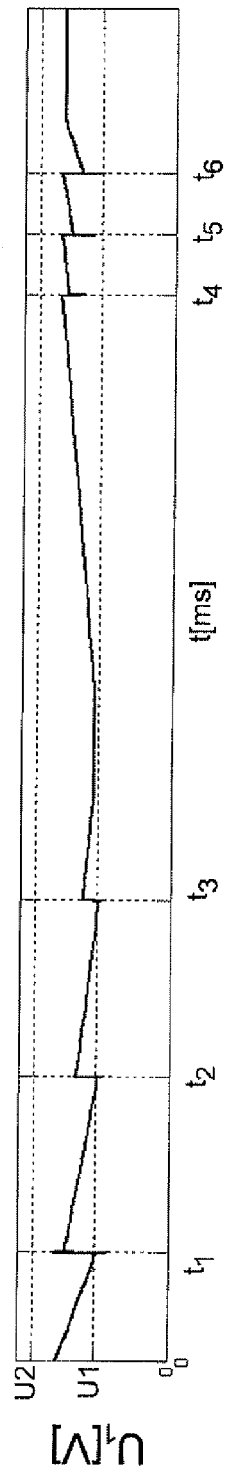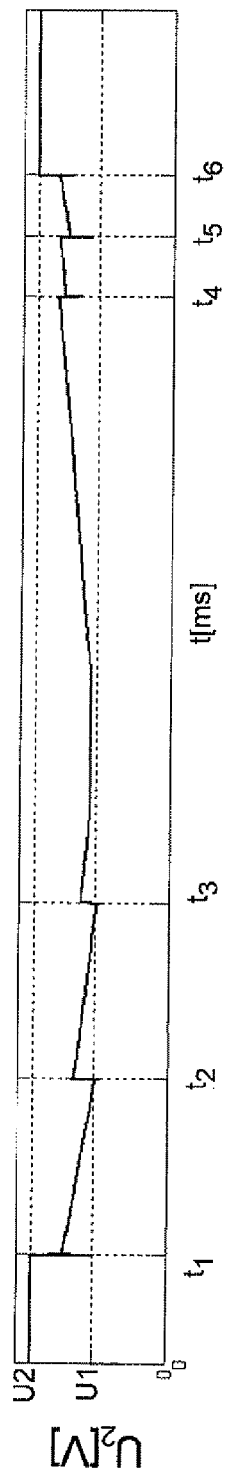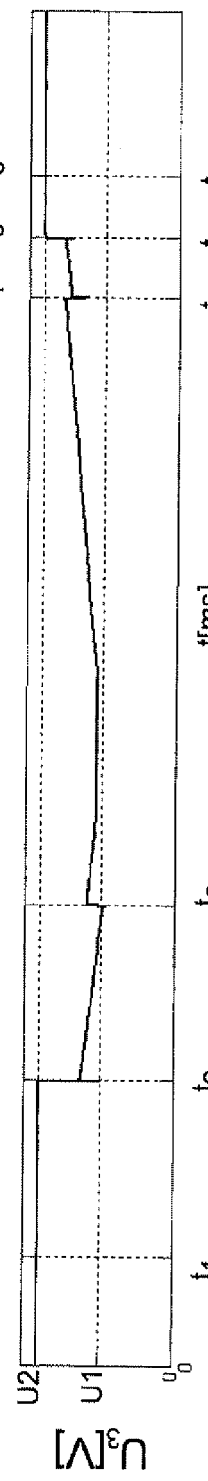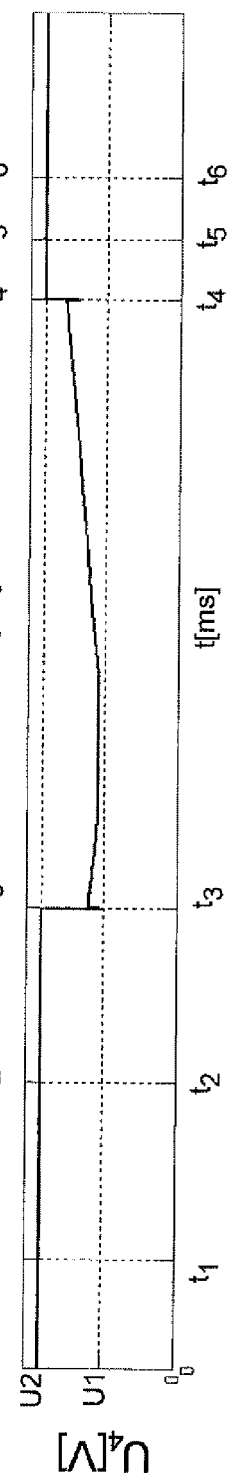

ELECTRICAL VOLTAGE SUPPLY

BACKGROUND OF THE INVENTION

1. Field of the Invention

The invention relates to an electrical voltage supply for providing a controlled output voltage.

2. Description of Related Art

Gabriel A. Rincon-Mora et al., "A Low-Voltage, Low Quiescent Current, Low Drop-Out Regulator", IEEE Journal of Solid-State Circuits, Vol. 33, No. 1, January 1998 disclose a voltage supply of the above type that has a voltage source whose output voltage is independent of the load current. The voltage source is assigned to a closed-loop control circuit which has as an actuating element a field-effect transistor whose source-drain path connects a first connection of the voltage source to a first output connection of the voltage supply. A second connection of the voltage source is connected to a second output connection of the voltage supply. An electrical load may be connected to the output connections of the voltage supply. The gate of the field-effect transistor is connected to an actuation signal output of an operational amplifier, which serves as a closed-loop controller. A noninverting input of the operational amplifier is connected to the output voltage that is present at the output connections across a voltage divider, and a desired voltage signal is present at an inverting input of the operational amplifier. When a deviation between the output voltage and the desired voltage signal occurs, the operational amplifier changes the gate voltage that is present between the gate and the source of the field-effect transistor in such a way that the deviation is reduced. Since the field-effect transistor is controlled via the gate-source voltage and since the source is connected to an output connection of the voltage supply, it is also possible to achieve closed-loop control of the output voltage even when the output voltage of the voltage source is only somewhat larger than the output voltage of the voltage supply that is present at the load. As a result, when current is drawn at the output connections, only a slight power loss occurs at the field-effect transistor. This is particularly advantageous with portable electronic devices in which a disposable or rechargeable battery serves as the voltage source. When power is drawn from the voltage supply, though, it is disadvantageous if a voltage drop occurs at the internal resistance of the voltage source, which is always present, aside from that at the field-effect transistor. The voltage source therefore should be dimensioned in such a way that its source voltage is slightly above the desired output voltage at the maximum current draw. However, when the current draw is low, a small voltage drop on the internal resistance of the voltage source results. In order nevertheless to regulate the output voltage to the desired value a corresponding voltage drop must be produced at the field-effect transistor, which causes a high power loss and therefore a low efficiency. Reducing the internal resistance directly by configuring a plurality of available voltage sources in parallel and thereby increasing the efficiency is particularly impracticable if the individual voltage sources have different characteristics, for example different open-circuit voltages, which can result in quadrature-axis currents and therefore energy losses. Furthermore, the use of different voltage sources is not practicable for the same reason.

Therefore, the object of the invention is to provide a closed-loop-controlled electrical voltage supply that makes it possible to have high efficiency in a wide working range.

SUMMARY OF THE INVENTION

This object is accomplished by an electrical voltage supply having at least two voltage sources for supplying output connections and having a closed-loop control circuit for controlling an output voltage that is present at the output connections, wherein for each voltage source the closed-loop control circuit has one actuating element that has a current path via which a connection of the respective voltage source may be connected to an output connection, wherein each actuating element has a respective actuating signal input for setting the electrical conductivity of its current path, wherein the closed-loop control circuit has a closed-loop controller to which the output voltage and a desired voltage signal are supplied, wherein the closed-loop controller interacts with the actuating signal inputs of the actuating elements in such a way that, when a deviation occurs between the output voltage and the desired voltage signal, the control of at least one actuating signal input is changed in order to reduce the deviation, and wherein the actuating signal inputs are connected to a control device that is designed in such a way that the current path of at least one actuating element is enabled for control by the closed-loop controller if the output current that is drawn at the output connections is present in a predetermined value range assigned to the respective actuating element, and that the current path is disabled if the output current that is drawn at the output connections does not lie in the predetermined value range.

Therefore the voltage supply has, in an advantageous manner, a plurality of voltage sources that, depending on the output current from the voltage supply flowing to the output connections, are connected to the output of the voltage supply or are disconnected from this output. In this way it is possible, when there is a small output current, to draw this output current only from a single voltage source. The output voltage of this voltage source, which is under a high load in relative terms, only needs to be reduced slightly by the actuating element in order to achieve the desired output voltage from the voltage supply, which results in a high degree of efficiency. If the output current increases and the source voltage of the respective voltage source falls below a predetermined value on the basis of its internal resistance, then at least one additional voltage source is connected to the output. As soon as the output current decreases and once again lies within the predetermined value range assigned to the first-mentioned voltage source, the number of voltage sources connected to the output of the voltage supply is reduced. Since all of the voltage sources can be connected to the output of the voltage supply via separate actuating elements, and since the voltages of the individual voltage sources always lie above the output voltage, a flow of current between the individual voltage sources cannot result. In this way the voltage supply makes it possible to operate the voltage sources over a wide output current range in each case at a favorable operating point and in this way correspondingly reduce the power loss that occurs on the voltage supply. Here, voltage sources of various designs and/or qualities may be combined with each other provided that their open-circuit voltage is greater than the desired output voltage of the voltage supply.

In a preferred embodiment of the invention the voltage sources are fuel cells. Here it is even possible for the value ranges for the output current from the voltage supply that are assigned to the individual actuating elements to be selected in such a way that the operating points of the fuel cells in each case lie in the linear or ohmic range of their characteristic current-voltage curves.

It is advantageous if the actuating elements are field-effect transistors whose sources in each case are connected to a connection of a voltage source and whose drains in each case are connected to an output connection of the voltage supply, if the closed-loop controller has an operational amplifier that is connected at a first operational amplifier input to the output connection of the voltage supply and that is connected at a second operational amplifier input to a sensor for the desired voltage signal, and if an output of the operational amplifier can be connected via the control device to the gate connections of the field-effect transistors that form the actuating signal inputs. The source voltages of the voltage sources then only need to be somewhat greater than the output voltage of the voltage supply (low-drop in-phase regulator).

In a preferred embodiment of the invention the control device has a switch arrangement that has an input that is connected to the output of the operational amplifier and that has a plurality of outputs, each of which is connected to an actuating signal input of an actuating element, wherein the switch arrangement has an address input by which means the input of the switch arrangement can be connected optionally or alternately with each output of the switch arrangement by applying an addressing signal, and wherein the address input is connected to a control logic. The switch arrangement may then be implemented economically with the aid of transistors, which in some cases may be integrated together with the closed-loop controller, the sensor for the desired voltage signal, and/or the voltage sources into a semiconductor chip.

It is advantageous if the control logic has a shift register that is connected at its register output to the address input of the switch arrangement, if in the shift register there are stored a number of control words that at least correspond to the number of states in the switch arrangement that are to be set and that have at least one bit for each current path that is to be disabled or enabled, if the shift register has at least one open-loop control input for a shift clock signal by which means the control words may be output one after another at the register output, and if the at least one open-loop control input is connected to a shift clock signal generator that has a control connection to the output of the operational amplifier in such a way that the control word that is output at the register output is selected depending on the load on the electrical voltage supply. The individual switches in the switch arrangement may be controlled in a simple manner with the aid of the shift register. It may also be possible to store at least two different blocks containing control words in the shift register, and by means of a selection device to select one of these blocks for controlling the switch arrangement. With the individual blocks containing control words, different voltage sources can be connected via the actuating elements to the output connections in each case in a range in which the output current of the voltage supply is frequently present and/or is present for a long time. The switching between the blocks containing the control words can be accomplished in such a way that the individual voltage sources are discharged or loaded more or less uniformly over a relatively long period of time.

In a preferred embodiment of the invention the voltage supply has a measuring device for measuring a measured signal that is dependent on a source current that is flowing in the current path of at least one actuating element, where the shift clock signal generator has at least one comparator that, at a first comparator input is connected to a measured signal output of the measuring device, at a second comparator input is connected to a reference signal generator, and at one comparator output is connected to the open-loop control input of the shift register, and where the open-loop control input of the shift register is edge-triggered. By evaluating the measured signal the shift register can be controlled in a simple manner.

It is advantageous if the measured signal output is formed by the output of the operational amplifier or is connected to the operational amplifier across a voltage divider. In this way the actuating signal that is present at the output of the operational amplifier can be used as a measured signal to control the comparator.

In another embodiment of the invention, the measuring device has at least one ammeter to measure a current flowing in the current path of at least one actuating element. The measuring device may, for example, have a shunt that is connected in series to the respective voltage source.

In another preferred embodiment of the invention, the measuring device has at least one temperature sensor that is designed to measure the temperature of a voltage source. In this way the measured signal that depends on at least one source current can be measured in a low-loss manner.

However, it is also possible for the shift clock signal generator to have at least one comparator that is connected directly to a first comparator input or indirectly, preferably across a voltage divider, to one of the output connections, which at a second comparator input is connected to a reference voltage source and at a comparator output is connected to the open-loop control input of a shift register, and that the open-loop control input of the shift register is edge-triggered. In this way a measuring device connected on the incoming side of the comparator can be eliminated.

It should also be noted that the first comparator input can also be controlled with an external signal, which may be dependent, for example, on the power drawn at the output connections of the voltage supply or on the output current of the voltage supply. Such an external signal may be provided, for example, by a load connected to the output connections.

The reference voltage source preferably has an adjustment device for setting the reference voltage. This makes it possible to match the output current value ranges in which the actuating elements assigned to the voltage sources are enabled for controlled by the closed-loop controller to, for example, the requirements of a load connected to the output of the voltage supply and/or to the charge state of the voltage sources (such as a disposable or rechargeable battery).

BRIEF DESCRIPTION OF THE DRAWINGS

Embodiment examples of the invention are explained in greater detail below. The drawing shows:

FIG. 1 a circuit diagram of a first embodiment example of a closed-loop-controlled electrical voltage supply, FIG. 2 a graphical representation of the output current of a second embodiment example of the voltage supply in which time is plotted on the abscissa and the output current is plotted on the ordinate, FIG. 3 a graphical representation of the output current of the voltage supply for the output current shown in FIG. 2 in which time is plotted on the abscissa and the output voltage is plotted on the ordinate, FIG. 4 a graphical representation of an actuating signal of a voltage regulator for the output current curve shown in FIG. 2 in which time is plotted on the abscissa and the actuating signal is plotted on the ordinate, FIG. 5 a graphical representation of the efficiency of the voltage supply with the output current curve shown in FIG. 2 in which time is plotted on the abscissa and the efficiency is plotted on the ordinate, and FIGS. 6A to 6D graphical representations of the source voltages of four voltage sources from the second embodiment example of the voltage supply in which time is plotted on the abscissa and the source voltage of the respective voltage source is plotted on the ordinate.

DESCRIPTION OF THE PREFERRED EMBODIMENTS

Figure 1:
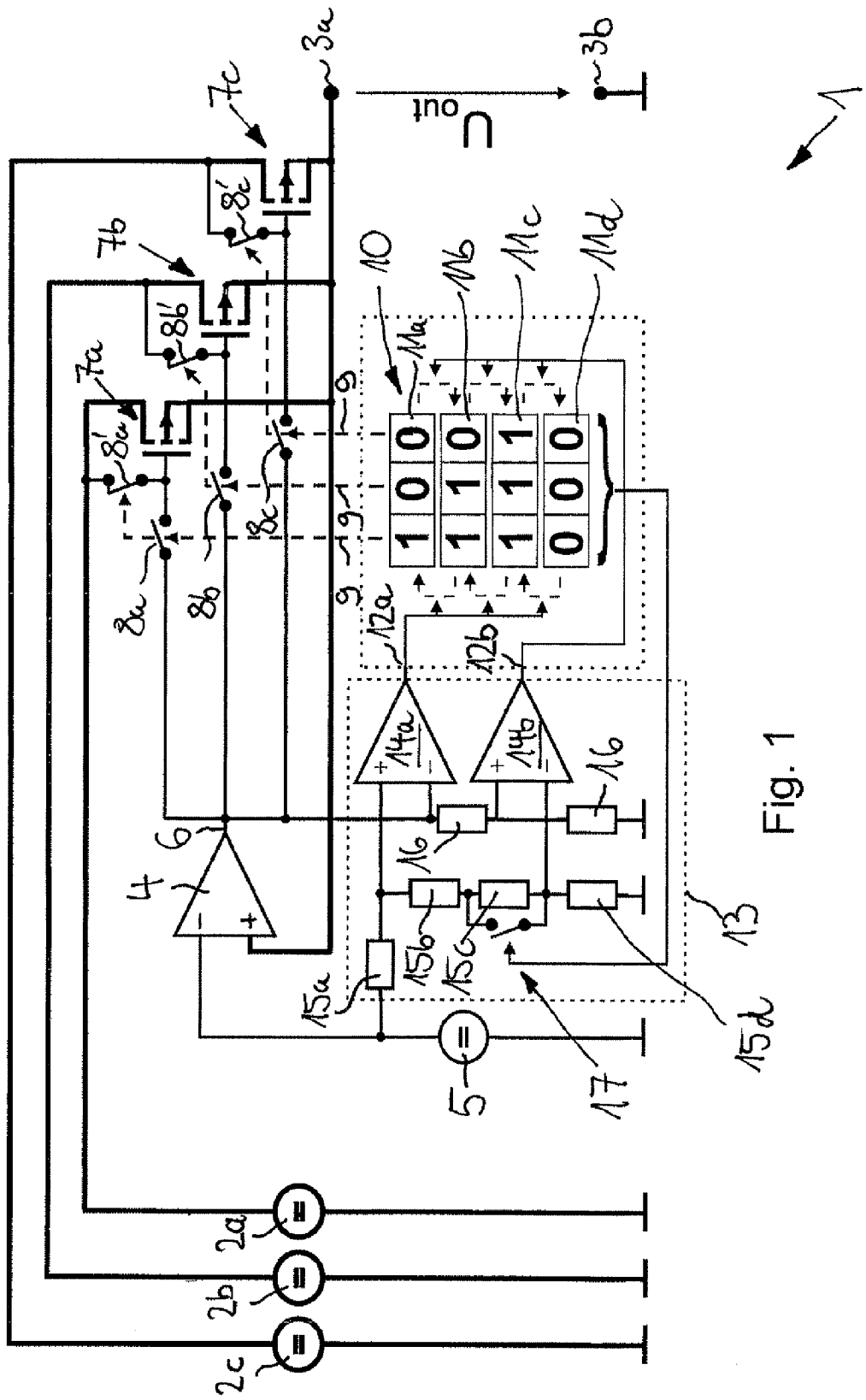

A first embodiment example of an electrical voltage supply identified in its entirety in FIG. 1 with 1 has three voltage sources 2a, 2b, 2c that can be connected to the output connections 3a, 3b to attach a load, which is not shown in the drawing. The source voltages at the connections of the voltage sources 2a, 2b, 2c are dependent on the load current applied to the voltage sources 2a, 2b, 2c. The voltage sources 2a, 2b, 2c are preferably embodied as fuel cells, for example as PEM fuel cells.

In order to achieve closed-loop control of an output voltage $U_{out}$ present at the output connections 3a, 3b of the voltage supply 1, the voltage supply 1 has a closed-loop control circuit that has a P controller with an operational amplifier 4. A noninverting input of the operational amplifier 4 is connected to a first output connection 3a of the voltage supply 1, and an inverting input of the operational amplifier 4 is connected to a sensor 5 for a desired voltage signal. A voltage that corresponds to the closed-loop control deviation and is proportional to the difference between the output voltage $U_{out}$ and the desired voltage signal is present at the output 6 of the operational amplifier 4.

For each voltage source 2a, 2b, 2c the closed-loop control circuit has a corresponding actuating element formed by a field-effect transistor 7a, 7b, 7c. The source of each field-effect transistor 7a, 7b, 7c is connected to a first connection of the voltage source 2a, 2b, 2c assigned to the respective field-effect transistor 7a, 7b, 7c. A second connection of each voltage source 2a, 2b, 2c is connected, respectively, to a second output connection 3b of the voltage supply 1, which is at ground potential. The drain of each field-effect transistor 7a, 7b, 7c is connected to the first output connection 3a of the voltage supply 1. Thus, a current path runs from each voltage source 2a, 2b, 2c across a drain-source path of a field-effect transistor 7a, 7b, 7c to the first output connection 3a.

In order to connect the output 6 of the operational amplifier 4 to the gates of the field-effect transistors 7a, 7b, 7c, which serve as actuating signal inputs, there is provided a control device that comprises a switch arrangement that has a first switching element 8a, 8b, 8c and second switching element 8a', 8b', 8c', respectively, for each field-effect transistor 7a, 7b, 7c. The first switching element 8a, 8b, 8c in each case connects the output 6 of the operational amplifier 4 to the gate of the corresponding field-effect transistor 7a, 7b, 7c. The second switching element 8a', 8b', 8c' in each case connects the gate of the corresponding field-effect transistor 7a, 7b, 7c to its drain.

The operational amplifier 4 interacts by means of the switch arrangement with the gates of the field-effect transistors 7a, 7b, 7c in such a way that, when a deviation occurs between the output voltage $U_{out}$ and the desired voltage signal, the control of at least one gate is changed in order to reduce the deviation.

The switch arrangement has an address input 9, which is only represented schematically in the diagram, to which an addressing signal that controls the first switching elements 8a, 8b, 8c and the second switching elements 8a', 8b', 8c' may be applied. When the first switching element 8a, 8b, 8c of a field-effect transistor 7a, 7b, 7c is opened, the corresponding second switching element 8a', 8b', 8c' of the respective field-effect transistor 7a, 7b, 7c is closed. In a corresponding manner, the second switching element 8a', 8b', 8c' of a field-effect transistor 7a, 7b, 7c is opened when the first switching element 8a, 8b, 8c of this field-effect transistor 7a, 7b, 7c is closed. With the aid of the address input 9 the gates of the field-effect transistors 7a, 7b, 7c may be connected to or disconnected from the output 6 of the operational amplifier independently of each other. If the gate is disconnected from the output 6, the drain-source path of the corresponding field-effect transistor 7a, 7b, 7c is disabled.

A control logic that has a shift register 10 is assigned to the switch arrangement. The shift register 10 has a register output that is connected to the address input 9 of the switch arrangement. A number of control words corresponding to the number of states of the switch arrangement that are to be set are stored in the shift register 10. Each control word has a number of bits that corresponds to the number of field-effect transistors 7a, 7b, 7c; each of these bits is assigned to one of the field-effect transistors 7a, 7b, 7c.

In the embodiment example shown in FIG. 1, the shift register 10 has four control words 11a, 11b, 11c, 11d, which have the values "000," "100," "110," and "111." Each of the control words 11a, 11b, 11c, 11d stored in the shift register 10 is output to the register output of the shift register 10.

If a first control word 11a is present at the register output, the gate of a first field-effect transistor 7a is connected to the output 6 of the operational amplifier 4, and the other field-effect transistors 7b, 7c are disabled. If a second control word 11b is present at the register output, the gate of a second field-effect transistor 7b is additionally connected to the output 6 of the operational amplifier 4, and only a third field-effect transistor 7c is disabled.

If a third control word 11c is present at the register output, the gates of all field-effect transistors 7a, 7b, 7c are each connected to the output 6 of the operational amplifier 4.

If a fourth control word 11d is present at the register output, all of the field-effect transistors 7a, 7b, 7c are disabled, regardless of the actuating signal present at the output of the operational amplifier 4. In this case the voltage supply 1 is shut off.

If the capacitive behavior of a load that is connected to the voltage supply is sufficiently pronounced, the switch from one of the control words 11a, 11b, and 11c to control word 11d makes it possible to deactivate the voltage supply briefly. In this way extremely small output currents can also be taken away, which prevents possible harmful output voltage interruptions or peaks.

In FIG. 1 it can be seen that the shift register 10 has control inputs 12a, 12b for a shift clock signal, by which means the control words can be output at the register output one after another. The control inputs 12b, 12b are connected to a shift clock signal generator 13 that has a first comparator 14a and a second comparator 14b.

The first comparator 14a is connected at a first comparator input to the output 6 of the operational amplifier 4. A second comparator input of the first comparator 14a is connected across a first voltage divider to the sensor 5 for the desired voltage signal. The first voltage divider as a first resistor 15a, a second resistor 15b, a third resistor 15c, and a fourth resistor 15d, which are connected in series. The first resistor 15a is connected at one of its connections to a first connection of the sensor 5, and the fourth resistor 15d is connected at one of its connections to a second connection of the sensor 5. A first node located between the first resistor 15a and the second resistor 15b is connected to the second comparator input of the first comparator 14a. A comparator output of the first comparator 14a is connected to a first open-loop control input 12a of the shift register 10.

The second comparator 14b is connected at a first comparator input across a second voltage divider 16 to the output 6 of the operational amplifier 4. A second comparator input is connected to the second node, which connects the third resistor 15e and the fourth resistor 15d. Arranged parallel to the third resistor 15c is a jumper switch 17 by which means the voltage at the second comparator input of the second comparator 14b can be switched between an upper voltage value and a lower voltage value.

FIGS. 2 to 6D show electrical signals that occur in a second embodiment example of the voltage supply 1 during a ramp-shaped increase or decrease of the output current I. In addition to the three voltage sources 2a, 2b, 2c and the three field-effect transistors 7a, 7b, 7c, the second embodiment example has a fourth voltage source and a fourth field-effect transistor.

Figure 2:
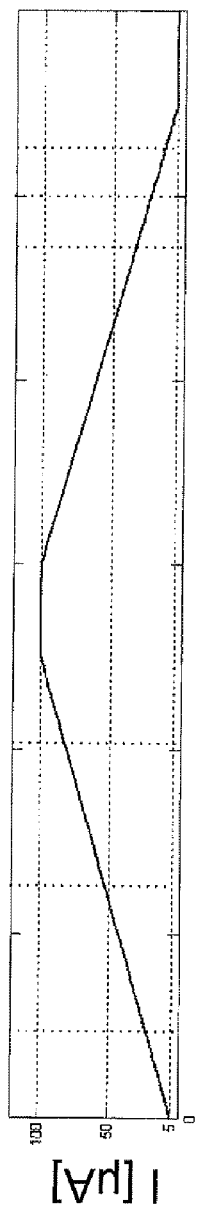
Figure 3:
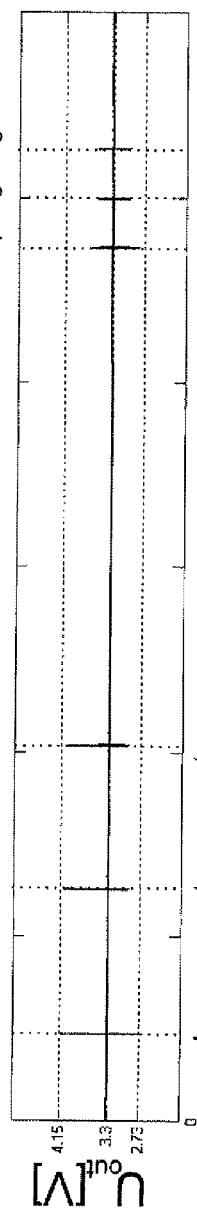

As can be seen in FIGS. 2 and 3, when the output current I that flows across the output connections is changed, the output voltage $U_{out}$ that is present at the output connections remains constant except for short switching pulses that occur when the switching device is operated.

Figure 4:
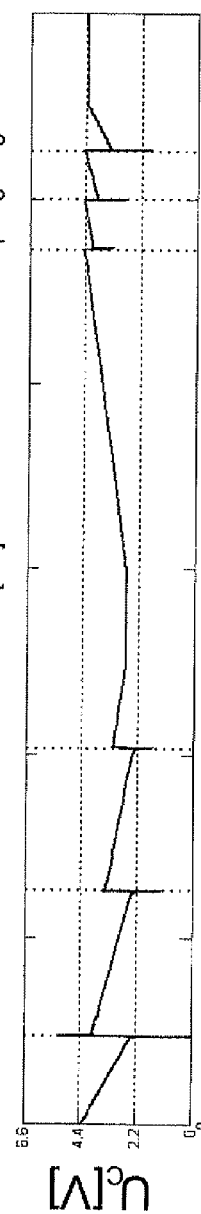

In a first time interval $[0 \ldots t_1]$ in which the output current I is small, only a first field-effect transistor is enabled for control by the operational amplifier. The other field-effect transistors are disabled. In FIG. 4 it can be seen that, as the output current I increases linearly, the output voltage $U_c$ of the operational amplifier 4 decreases from a first voltage value of about 4.4 V to a second voltage value of about 2.2 V. When this occurs, the second voltage value corresponds to the voltage at the second comparator input of the second comparator.

As soon as the output voltage $U_c$ has dropped to the second voltage value, at the beginning of a second time interval $[t_1 \ldots t_2]$ a second field-effect transistor is enabled for control by the operational amplifier in order to connect a second voltage source to the first output connection of the voltage supply. This causes the output voltage $U_c$ of the operational amplifier to increase abruptly. As a result of the further increase the output current I, the output voltage $U_c$ of the operational amplifier then decreases once again.

As soon as the output voltage $U_c$ of the operational amplifier has once again dropped to the second voltage value, at the beginning of a third time interval $[t_2 \ldots t_3]$ a third field-effect transistor is enabled for control by the operational amplifier in order to connect a third voltage source to the first output connection of the voltage supply. This causes the output voltage $U_c$ of the operational amplifier to once again increase abruptly and then to once again fall off due to the further increasing output current I.

As soon as the output voltage $U_c$ of the operational amplifier has once again dropped to the second voltage value, at the beginning of a fourth time interval $[t_3 \ldots t_4]$ the fourth field-effect transistor is enabled for control by the operational amplifier in order to connect the fourth voltage source to the first output connection of the voltage supply. This causes the output voltage $U_c$ of the operational amplifier to once again increase abruptly and then to fall off to a third voltage value between the first voltage value and the second voltage value due to the further increasing output current I.

After the output current I has reached a maximum value, it decreases linearly to its initial value. As a result the output voltage $U_c$ of the operational amplifier 4 increases until the first voltage value is reached. This corresponds to the voltage that is present at the second comparator input of the first comparator.

As soon as the output voltage $U_c$ of the operational amplifier has reached the first voltage value, the fourth field-effect transistor is disabled at the beginning of the fifth time interval $[t_4 \ldots t_5]$. As a result, the output voltage $U_c$ of the operational amplifier decreases abruptly to a value that lies between the first and second voltage values. Because of the further reduction of the output current I, the output voltage $U_c$ of the operational amplifier then increases once again.

As soon as the output voltage $U_c$ of the operational amplifier has reached the first voltage value, the third field-effect transistor is disabled at the beginning of a sixth time interval $[t_5 \ldots t_6]$. This causes the output voltage $U_c$ of the operational amplifier to once again decrease abruptly and then to increase once more because of the further decreasing output current I.

As soon as the output voltage $U_c$ of the operational amplifier has reached the first voltage value again, the second field-effect transistor is disabled at the beginning of a seventh time interval $[t_6 \ldots t_7]$. This causes the output voltage $U_c$ of the operational amplifier to once again decrease abruptly and then to increase once more because of the further decreasing output current I.

Figure 5:
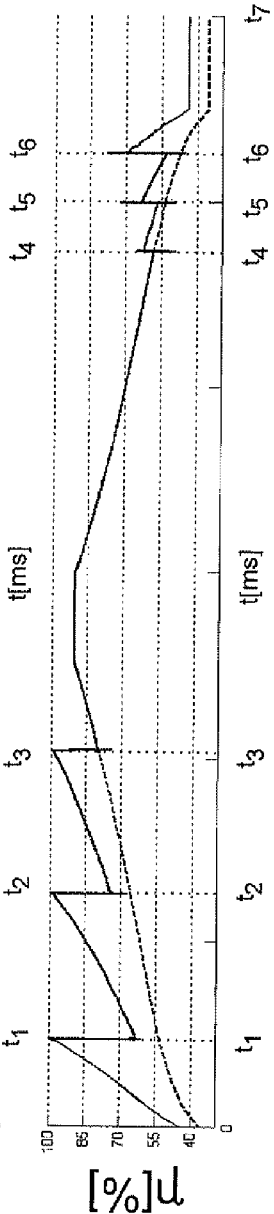

In FIG. 5 it can be seen that the efficiency $\eta$ of the voltage supply (solid line) in the time intervals $[0 \ldots t_3]$ and $[t_4 \ldots t_7]$ in which some of the voltage sources are not connected to the first output connection of the voltage supply is greater than the efficiency of a corresponding voltage supply in which all voltage sources are continuously connected at the first output connection (dotted line).

Since the magnitude of the power loss is proportional to the conductivity of the actuating elements, the voltage supply 1 achieves a stabilization of the output voltage at the maximum possible conductivity of the active actuating elements. Not until the current supplied by the loaded voltage sources with all of the actuating elements opened to the maximum is no longer suitable for stabilizing the output voltage in a suitable manner are additional voltage sources 2a, 2b, 2c loaded, in other words their actuating elements are opened and the conductivity of all active actuating elements is reduced to an appropriate extent. In the event of a simultaneous activation of all actuating elements without a full load being present, the power loss at the actuating elements would be increased compared with the described voltage supply 1 because of their reduced conductances.

In FIGS. 6A-6D it can be seen in time interval $[t_1 \ldots t_3]$ that each time a voltage source is added to the circuit, the source voltages of the voltage sources that were connected to the first output connection of the voltage supply immediately before the time the voltage sources were added to the circuit increase abruptly and that the source voltage of the voltage source that is added on in each case decreases abruptly compared with its open-circuit voltage.

It can also be seen in time interval $[t_4 \ldots t_6]$ that each time a voltage source is removed from the circuit, the source voltages of the voltage sources that were connected to the first output connection of the voltage supply immediately before the time the voltage sources were removed from the circuit decrease abruptly and that the source voltage of the voltage source that is removed in each case increases abruptly to its open-circuit voltage.

The invention claimed is:
1. An electrical voltage supply comprising:
at least two voltage sources for supplying an output connection; and
a closed-loop control circuit to control an output voltage that is present at the output connection, the closed-loop control circuit including, for each voltage source, one actuating element that has a current path via which a connection of a respective one of the respective voltage sources is connectable to said output connection, wherein each actuating element has a respective actuating signal input for setting the electrical conductivity of a current path, wherein the closed-loop control circuit has a closed-loop controller to which the output voltage and a desired voltage signal are supplied, wherein the closed-loop controller interacts with the actuating signal inputs of the actuating elements in such a way that, when a deviation occurs between the output voltage and the desired voltage signal, the control of at least one actuating signal input is changed in order to reduce the deviation, wherein the actuating signal inputs are connected to a control device that is designed in such a way, that the current path of at least one actuating element is enabled for control by the closed-loop controller if an output current that is drawn at the output connection is present in a predetermined value range assigned to the respective actuating element, and wherein the current path is disabled if the output current that is drawn at the output connection does not lie in the predetermined value range.

2. The electrical voltage supply of claim 1, wherein the voltage sources are fuel cells.

3. The electrical voltage supply of claim 1, wherein the actuating elements are field-effect transistors whose sources in each case are connected to a connection of a corresponding on of said voltage sources and whose drains in each case are connected to an output connection of the voltage supply, the closed-loop controller has an operational amplifier that is connected at a first operational amplifier input to the output connection of the voltage supply and that is connected at a second operational amplifier input to a sensor for the desired voltage signal, and an output of the operational amplifier can be connected via the control device to the gate connections of the field-effect transistors that form the actuating signal inputs.

4. The electrical voltage supply of claim 1, wherein the control device has a switch arrangement that has an input that is connected to the output of the operational amplifier and that has a plurality of outputs, each of which is connected to an actuating signal input of an actuating element, the switch arrangement has an address input by which means the input of the switch arrangement can be connected optionally or alternately with each output of the switch arrangement by applying an addressing signal, and the address input is connected to a control logic.

5. The electrical voltage supply of claim 1, wherein the control logic has a shift register that is connected at its register output to the address input of the switch arrangement, and wherein in the shift register there are stored a number of control words that at least correspond to the number of states in the switch arrangement that are to be set and that have at least one bit for each current path that is to be disabled or enabled, the shift register has at least one open-loop control input for a shift clock signal by which means the control words may be output one after another at the register output, and the at least one control input is connected to a shift clock signal generator that has a control connection to the output of the operational amplifier in such a way that the control word that is output at the register output is selected depending on the load on the electrical voltage supply.

6. The electrical voltage supply of claim 1, wherein the voltage supply has a measuring device for measuring a measured signal that is dependent on a source current that is flowing in the current path of at least one actuating element, the shift clock signal generator has at least one comparator that, at a first comparator input, is connected to a measured signal output of the measuring device, at a second comparator input is connected to a reference signal generator, and at one comparator output is connected to the open-loop control input of the shift register, and the open-loop control input of the shift register is edge-triggered.

7. The electrical voltage supply of claim 1, wherein the measured signal output is formed by the output of the operational amplifier or is connected to the operational amplifier across a voltage divider.

8. The electrical voltage supply of claim 1, wherein the measuring device has at least one ammeter to measure a current flowing in the current path of at least one actuating element.

9. The electrical voltage supply of claim 1, wherein the measuring device has at least one temperature sensor for measuring the temperature of a voltage source.

10. The electrical voltage supply of claim 1, wherein the shift clock signal generator has at least one comparator that is connected directly to a first comparator input or indirectly to the output connection, which at a second comparator input is connected to a reference voltage source and at a comparator output is connected to the open-loop control input of a shift register, and that the open-loop control input of the shift register is edge-triggered.

11. The electrical voltage supply of claim 1, wherein the reference voltage source has an adjustment device to set the reference voltage.

12. The electrical voltage supply of claim 10, wherein said at least one comparator is connected to the output connection across a voltage divider.

13. The electrical voltage supply according to claim 1, wherein the actuating element is a field-effect transistor.

* * * * *